(12) United States Patent
Bartch

(10) Patent No.: US 6,416,101 B1
(45) Date of Patent: Jul. 9, 2002

(54) FOOD SERVICE TRAILER

(76) Inventor: David W. Bartch, 238 N. Simmons St., Stockton, IL (US) 61085

( * ) Notice: Subject to any disclaimer, the term of this patent is extended or adjusted under 35 U.S.C. 154(b) by 0 days.

(21) Appl. No.: 09/789,201

(22) Filed: Feb. 20, 2001

(51) Int. Cl.$^7$ ............................. B60P 3/025; B60P 3/35; B60N 2/30
(52) U.S. Cl. ..................... 296/22; 296/168; 296/181; 296/26.02
(58) Field of Search ................. 296/22, 26.02, 296/26.12, 26.13, 26.14, 26.15, 181, 156, 162, 163, 172, 173, 176, 175, 168

(56) References Cited

U.S. PATENT DOCUMENTS

| | | | |
|---|---|---|---|
| 1,654,330 A | | 12/1927 | Jenkins |
| 2,603,500 A | | 7/1952 | Messier |
| 3,667,799 A | | 6/1972 | Shryock |
| 3,741,606 A | | 6/1973 | Grier |
| 3,884,520 A | | 5/1975 | Peterson |
| 3,940,175 A | | 2/1976 | Robinson |
| 4,167,983 A | * | 9/1979 | Seider et al. .................. 296/22 |
| 4,413,855 A | * | 11/1983 | Flanagan ..................... 296/162 |
| 4,501,457 A | | 2/1985 | Pond |
| 4,842,316 A | | 6/1989 | Lerma et al. |
| 4,869,030 A | * | 9/1989 | Clark ......................... 296/162 |
| 4,883,306 A | * | 11/1989 | Stuckey ....................... 296/162 |
| 5,108,122 A | | 4/1992 | Beagley |
| 5,261,435 A | | 11/1993 | Stanley et al. |
| 5,280,801 A | | 1/1994 | Brosman |
| 5,462,330 A | | 10/1995 | Brown |
| 5,833,295 A | | 11/1998 | Farlow, Jr. |
| 5,979,125 A | * | 11/1999 | Guillet ...................... 296/26.02 |
| 5,997,073 A | * | 12/1999 | Vanderhoof .................. 296/162 |
| 6,283,537 B1 | * | 9/2001 | DeVore, III .................. 296/181 |

* cited by examiner

Primary Examiner—Joseph D. Pape
Assistant Examiner—Greg Blankenship
(74) Attorney, Agent, or Firm—Lathrop & Clark LLP

(57) ABSTRACT

A steel frame supports a trailer body which encloses a refrigerator freezer, a gas stove or grill, and storage space for a generator, LP gas tanks, and canopy components. During transport the trailer is covered by two hinged covers, and two side benches are retracted and retained elevated alongside the trailer body. In use, the covers are rotated 180 degrees about hinges to form counters for service of up to eight diners. Each bench has two legs which are slidably received within fittings on the ends of two horizontal extension members which telescope within tubular cross members mounted beneath the trailer body. The legs are elevated and held in place by spring catches. In service, the benches are extracted and lowered, and the covers deployed to define counters. A canopy has side poles which engage the ground, and bracing poles which extend from the trailer body, all being trailer stowable.

22 Claims, 5 Drawing Sheets

FOOD SERVICE TRAILER

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to food preparation and dining structure in general, and to transportable food service equipment in particular.

Within a residence or restaurant, food preparation and storage is facilitated by electric or gas appliances, such as stoves, refrigerators, and electric equipment. There are many occasions, however, where meals must be served in locations remote from installed kitchen facilities: for example, at fairs, carnivals, sporting events, outdoor parties, picnics, parades, expositions and celebrations, construction sites, harvest and planting sites, camping and sight-seeing excursions, etc. Those charged with providing meals at these outdoor locations must either bring previously prepared foods-usually cold, or arrange for food preparation equipment to be temporarily installed. For heavy demand applications full sized kitchens on wheels are available. These may be specialized trucks with kitchen facilities, or towable trailers which include enclosed cookspace. Large dedicated vehicles or trailers, however, can be costly and cumbersome to transport. A full sized trailer may require a heavy truck and specialized driving skills to transport.

What is needed is a food service trailer which is compact enough to be readily towed by a mid-sized automobile, yet which offers basic food preparation and serving facilities.

SUMMARY OF THE INVENTION

The food service trailer of this invention has a steel frame which supports a body which encloses a refrigerator freezer, a gas stove or grill, and storage space for a generator, LP gas tanks, and canopy components. The cook top surface and refrigerator are covered during transport and storage by two hinged covers. In use, the covers are rotated 180 degrees about the hinges to form counters for service of up to eight diners. Seating for the diners is provided by retractable benches. Each bench has two legs which are slidably received within fittings on the ends of two horizontal extension members which telescope within tubular cross members mounted beneath the trailer body. In transport, the extension members are retracted, and the legs are elevated and held in place by spring catches. When in position for service, the benches are extracted and positioned, the covers are deployed, and, if desired, the trailer is separated from its towing vehicle and supported on a jack. A canopy has side poles which engage the ground, and bracing poles which extend from the trailer body. In transport, the canopy poles can be stored within a hollow central tube forming a part of the trailer frame.

It is an object of the present invention to provide a compact food service trailer which is expandable to provide food preparation facilities and seating for multiple diners.

It is another object of the present invention to provide a food service trailer which is of sufficiently low weight to allow it to be towed behind conventional mid-sized automobiles.

It is also an object of the present invention to provide a food service trailer which can be converted from a transportable configuration to a service configuration rapidly, and with a minimum of skill and specialized tools.

Further objects, features and advantages of the invention will be apparent from the following detailed description when taken in conjunction with the accompanying drawings.

DESCRIPTION OF THE PREFERRED EMBODIMENTS

Figure 1:
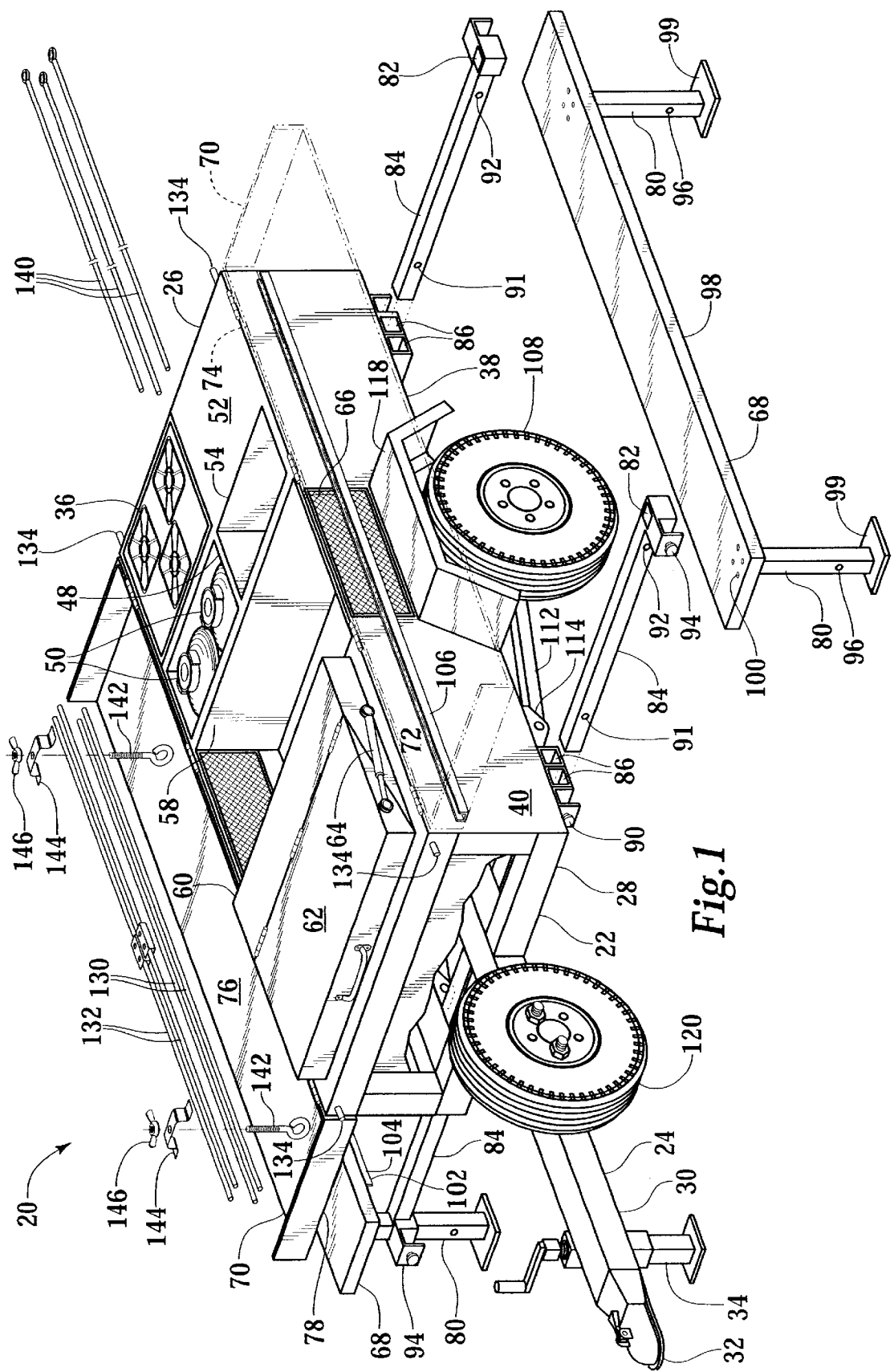
FIG. 1 is an exploded isometric view of the food service trailer of this invention, partially broken away to show the trailer frame.

Referring more particularly to FIGS. 1–5, wherein like numbers refer to similar parts, a food service trailer 20 of this invention is shown in FIG. 1. The trailer 20 has a welded steel frame 22 which includes a square tubular central member 24 which extends from the trailer rear end 26 to its front end 28. The front portions of the central member 24 serve as a tow bar or tongue 30. The tow bar 30 extends from the body of the trailer about 5½ feet. A hitch fitting 32 is connected to the front of the tow bar 30 for attachment of the trailer to a towing vehicle, which may be any truck or mid-size automobile. A conventional support jack 34 is connected to the tow bar 30, permitting the trailer to be supported when unconnected to a towing vehicle. Wedge shaped chocks may be inserted beneath the wheels 108 when the trailer is disconnected from the towing vehicle.

Figure 4:
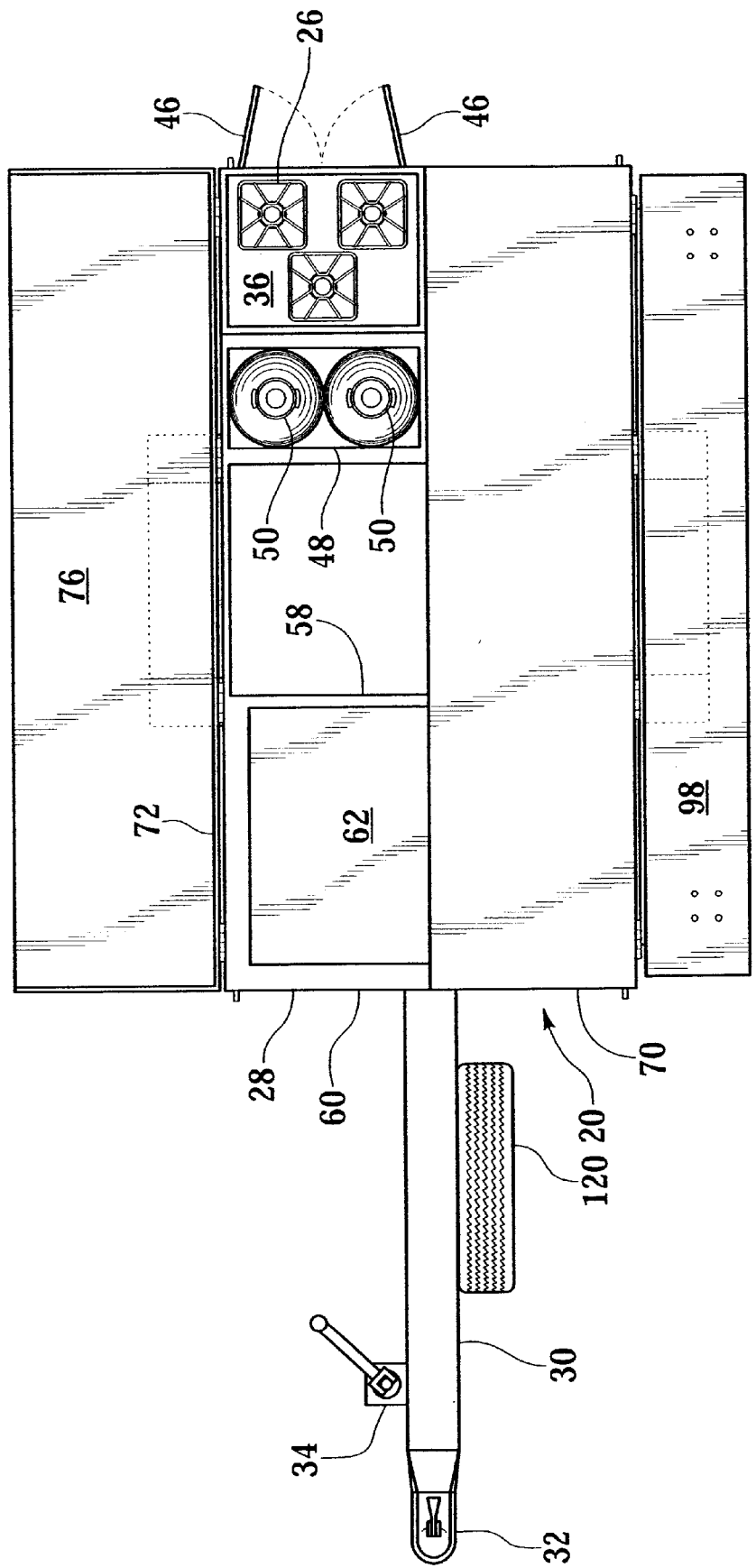
FIG. 4 is a top view of the trailer of FIG. 1, with one of the two covers opened.
Figure 5:
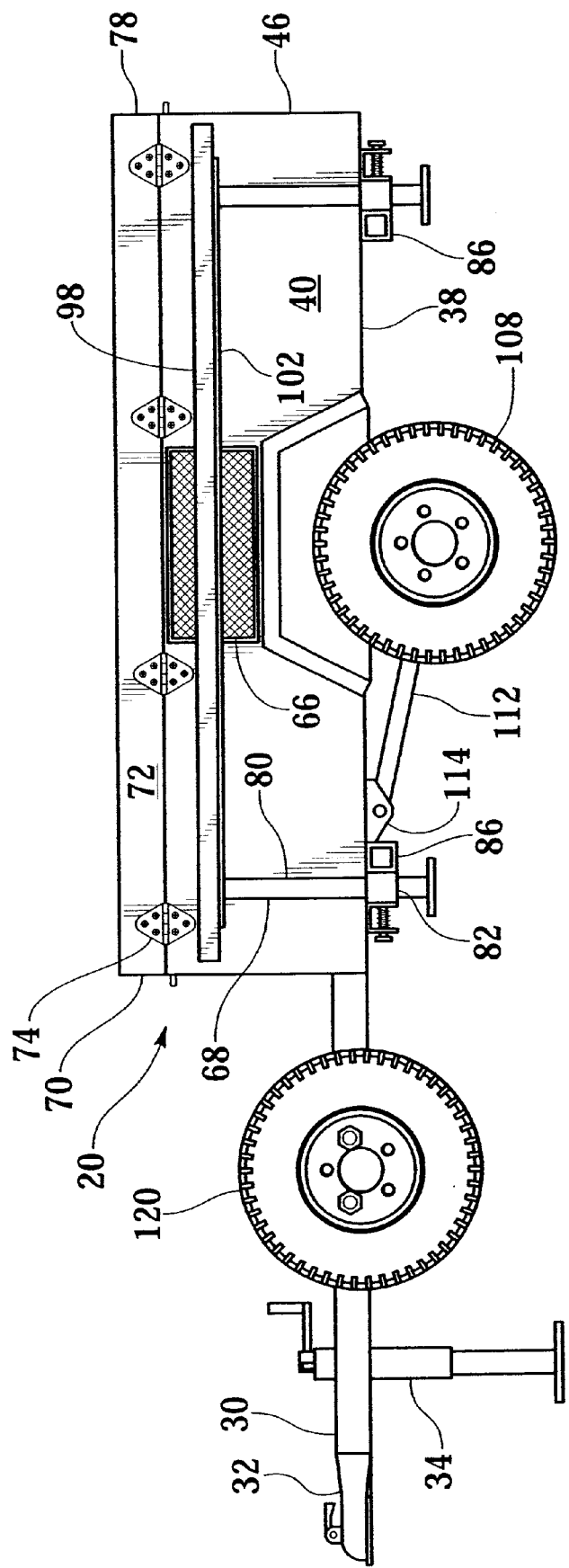
FIG. 5 is a side elevational view of the trailer of FIG. 1 in a closed configuration.

The trailer 20 provides readily transportable food preparation facilities as well as seating and dining surfaces for a number of diners. As shown in FIG. 1, the trailer 20 has a body 38 formed on the frame 22 which houses food storage and preparation equipment. The body 38 is about four feet wide, and about eight feet long. The frame defines a generally box-like structure, to which side panels 40, and a front panel 42 are attached. As shown in FIG. 4, a cook top 36, preferably a gas stove, is mounted near the rear end 26 of the trailer. The cook top 36 is at a height of about 38 inches above the ground. An oven, not shown, is located beneath the cook top 36. A tank compartment 48 positioned frontwardly of the cook top 36 provides storage volume for one or more tanks 50 of LP gas, which supply the cook top. A counter top 52, about 22 inches by 22 inches, is positioned to the side of the cook top 36. Storage volume is available beneath the counter top. The storage areas and oven may be covered by hinged cabinet doors 46 which open sidewardly.

A storage compartment 54 for components of a canopy 56 is defined to the side of the tank compartment 48 and frontward of the counter top 52. A larger utility compartment 58 extends the full width of the body and is positioned frontward of the tank compartment 48 and the storage compartment 54. The utility compartment 58 houses an on-board generator, as well as a compressor, not shown, for the insulated refrigerator and freezer 60 which is mounted at the front of the body. For clarity in showing the frame if FIG. 1, lower portions of the refrigerator and freezer 60 have been broken away. The refrigerator and freezer 60 may be electric, or may be powered by LP gas. Thus, if desired, the trailer may be configured to operate without electricity. As shown in FIG. 1, the refrigerator and freezer 60 has a top lid 62 with side gas struts 64 which allow the lid to be held in an opened position. The refrigerator and freezer 60 has an interior volume of about 15 cubic feet. The utility compartment 58 is provided with ventilated side panels 66, which allow communication between the refrigerant compressor and the environmental air for cooling, as well as exhaust of fumes from the generator when in operation. It should be noted that alternatively, a propane refrigerator cooling system may be employed. Such a system consists of four main parts: a boiler, condenser, the evaporator, and absorber. Free air circulation is important to the function of the evaporator and the condenser.

Figure 3:
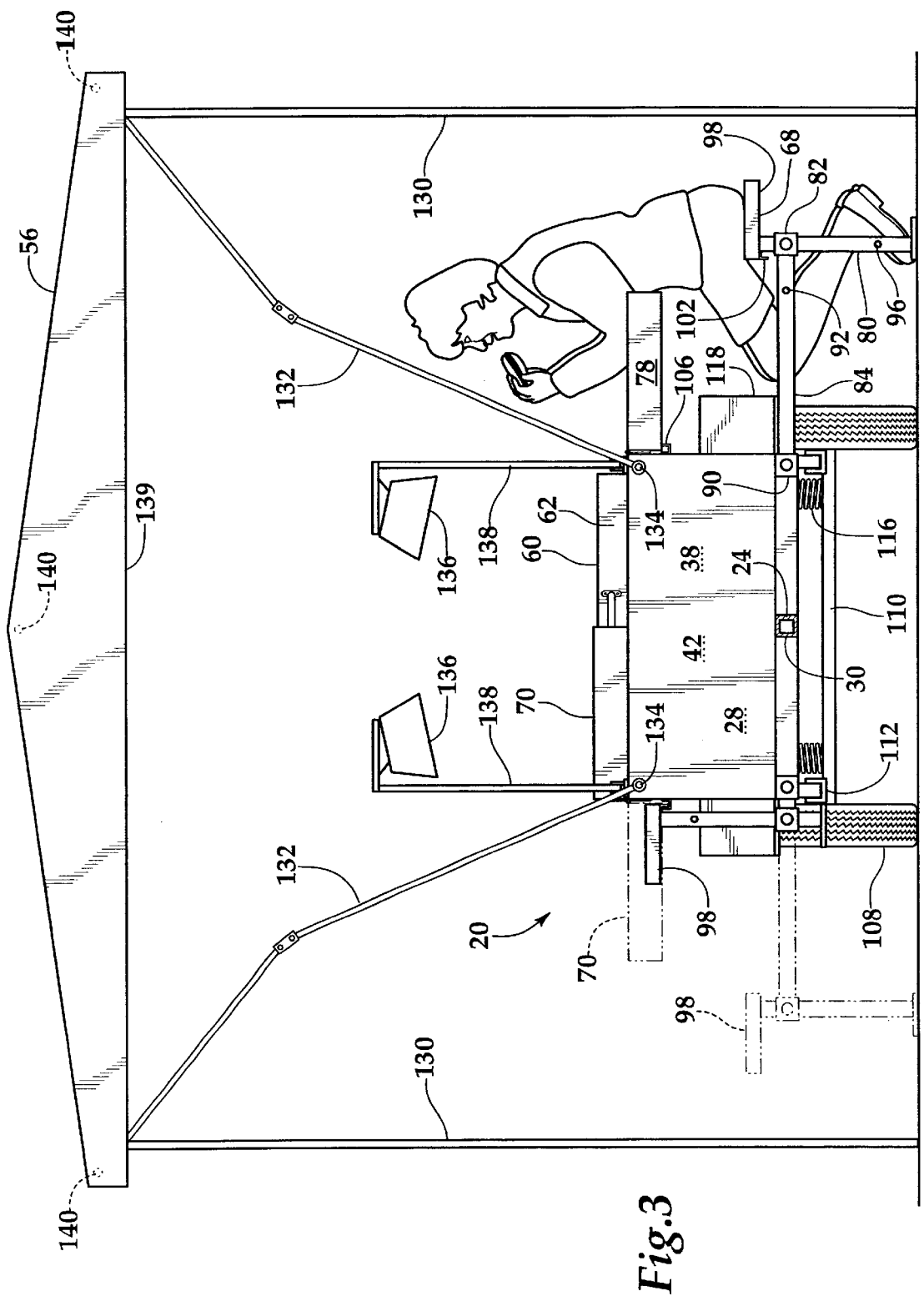
FIG. 3 is a front elevational view of the trailer of FIG. 1.

The trailer 20 is provided with side benches 68 and combination covers/tabletops 70, which, in the trailer's storage or transport configuration, are retracted and stored on the trailer body. As shown in FIG. 1, each cover 70 has a back panel 72 which is connected along its top edge to the frame 22 by a series of strap hinges 74. A counter panel 76 extends outwardly from the back panel 72, and is approximately perpendicular to the back panel. The counter panel 76 is maintained in its right angle relation to the back panel 72 by two rectangular side walls 78 which are fixed between the back panel and the counter panel at the front and rear of the body. Each counter panel 76 is one half the width of the trailer 20, so that when the covers 70 are rotated about the hinges 74 into a storage configuration, the two counter panels meet in the center of the trailer such that the covers 70 overlie the entire top surface of the trailer. As shown in FIG. 3, the covers 70 may be pivoted from their storage configuration, covering the top of the trailer, to a dining configuration, in which the back panels 72 abut against the side panels 40 of the trailer body.

Figure 2:
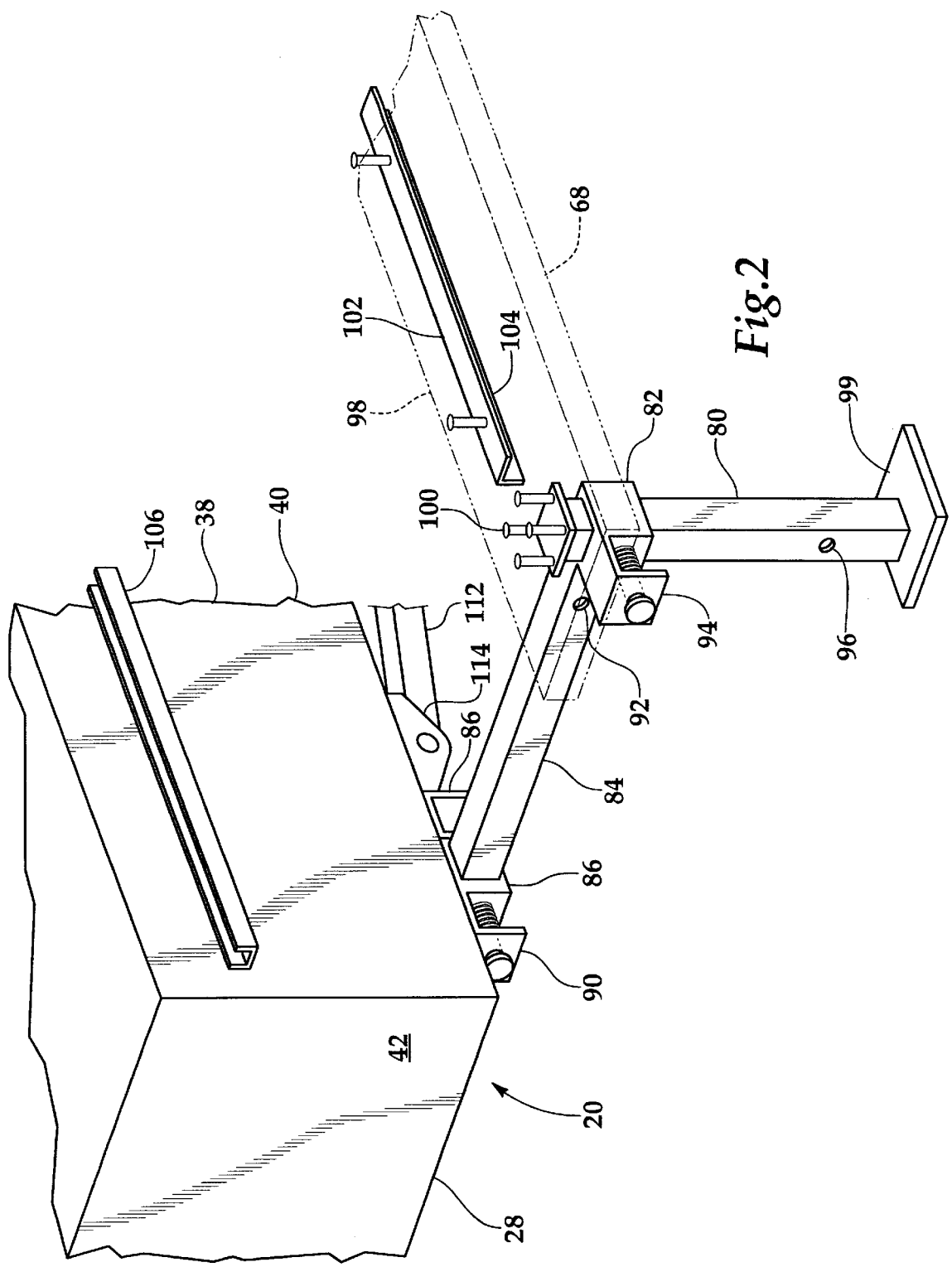
FIG. 2 is fragmentary isometric view of the trailer of FIG. 1.

As shown in FIG. 2, each side bench 68 has two vertical legs 80 which are slidably received within fittings 82 positioned at the outer ends of two side extension members 84. The side extension members 84 are slidably received within cross members 86 which are fixed to the trailer frame 22 beneath the body. The side extension members 84 are about four feet long. The cross members 86 are preferably square tubes which extend the full width of the trailer. However, it should be noted that the cross members could extend less than the full width of the trailer, and could be less than full square tubes, for example partial brackets. Two adjacent cross members 86 are positioned near the front and near the rear of the trailer body, to receive the two side extension members 84 from each bench 68. A spring catch 90 is positioned to extend into each cross member 86 to engage within a catch opening 92 in the side extension member 84. One catch opening 91, is positioned about one foot from the inner end of each extension member 84, to restrain the extension members from being removed from the trailer. When the spring catch 90 is engaged with the catch opening 92 when the side extension member 84 is fully retracted within the cross member 86, the bench 68 is fixed in its retracted position. When the spring catch 90 is engaged with the catch opening 91 when the side extension members 84 are fully extended, the benches are properly positioned with respect to the eating surfaces of the deployed covers 70. The benches are at a height of about 20 inches above the ground.

Spring catches 94 are also mounted to the legs 80 to serve as adjustable fasteners which engage with catch openings 96 formed in the lower portions of the legs, to retain the benches in an elevated, transportable configuration. When deployed, the legs are free floating within the fittings 82, thereby allowing the legs to abut the ground, despite uneven terrain. Each leg has a lower foot plate 99. Each bench 68 has a seat platform 98, preferably a wooden plank, which is attached by fasteners 100 to the legs 80. The plank is approximately the length of the trailer body, capable of seating comfortably four diners.

A right angle bracket 102 is preferably fixed to the seat platform 98, extending parallel to the side panel of the trailer body. The bracket presents a downwardly projecting flange 104 which, in a storage configuration, engages within an upwardly opening C-channel member 106 which is fixed to the side of the trailer, as shown in FIG. 3. The engagement between the right angle bracket 102 and the C-channel member 106 restricts flexing of the bench in transit, and minimizes movement of the bench with respect to the trailer, reducing wear on both structures.

As shown in FIG. 3, the trailer 20 is provided with a conventional undercarriage having two wheels 108 mounted on bearings to a cross axle 110 which is fixed to two angled carriage arms 112, shown in FIG. 1, which are rotatably pinned at front ears 114. Fenders 118 extend above each wheel 108. A spare tire 120 is mounted to the tow bar 30. A spring 116 extends between the cross axle 110 and the frame 22 adjacent each carriage arm 112.

As shown in FIG. 3, the canopy 56 is about 12 by 12 feet, and is supported on four corner poles 130, which are about seven feet long. The canopy has a fabric covering 139 which is supported on three transverse rods 140, shown in FIG. 3, which define a shallow pointed roof. The transverse rods 140 are about 12 feet long, and may be continuous full height tubes, which may be stored within the hollow interior of the central member 24. The central member 24 may be accessed at the rear of the trailer for removal and storage of the transverse rods 140. Collapsible interior braces 132 extend between pins 134 at the front end and the rear end of the trailer frame 22. Two interior braces 132, and two corner poles 130 may be stored within each of the covers 70, as shown in FIG. 1. Any appropriate attachment mechanism may be used for retaining the poles 130 and braces within the closed covers 70. For example, as shown in FIG. 1, threaded rods 142 may extend upwardly from the covers, and a bracket 144 may extend over the threaded rod, and be retained in place by a wingnut 146. Other mechanisms such as a spring clamp, cable ties, snap fittings, or the like may be employed. The canopy 56 may also be erected off the trailer, to provide additional shade for diners. For low light dining, lamps 136 may be mounted on lamp posts 138. The lamps 136 may be electric lights, powered by a generator, or may be gas lamps, supplied from the LP gas tanks.

It is understood that the invention is not limited to the particular construction and arrangement of parts herein illustrated and described, but embraces such modified forms thereof as come within the scope of the following claims.

I claim:

1. A food service trailer comprising:

a frame;

at least two wheels rotatably mounted to the frame;

a first cross member mounted to the frame;

a first extension member received within the first cross member and telescoping within the first cross member;

portions of the first extension member defining a leg fitting;

a first leg slidably received within the first extension member leg fitting;

a seat platform fixed to the first leg above the first extension member leg fitting;

portions of the first leg defining a leg base positioned below the leg fitting; and a fastener extending between the leg fitting and the first leg, wherein the first leg and the attached seat platform are movable between a lowered position in which the leg base is engagable with the ground, and an elevated position in which the leg base is elevated above the ground.

2. The food service trailer of claim 1 further comprising:

a second leg spaced rearwardly of the first leg;

a second cross member spaced rearwardly of the first cross member; and a second extension member spaced rearwardly of the first extension member, and having a fitting at an outward end which receives the second leg.

3. The food service trailer of claim 1 wherein the seat platform is positioned on a first side of the frame, and further comprising a second seat platform positioned on a second side of the frame, the second seat platform being connected to at least one vertical leg which is received within a fitting on a second extension member which is retractable within a cross member fixed to the frame.

4. The food service trailer of claim 1 further comprising:

an oven mounted to the frame; and a refrigerator mounted to the frame.

5. The food service trailer of claim 1 further comprising:

a plurality of vertically extending corner poles spaced from the frame; and a canopy extending over the frame and being supported by the corner poles.

6. The food service trailer of claim 1 further comprising:

an upwardly opening C-channel mounted to the frame; and an angle bracket fixed to the seat platform, and having a downwardly extending flange which is engagable within the C-channel to retain the seat platform in an elevated position.

7. The food service trailer of claim 1 wherein the frame has a central tubular member extending frontwardly, and wherein the central tubular member receives therein a plurality of corner poles, which are removable for supporting a canopy above the frame.

8. The food service trailer of claim 1 further comprising two covers hinged to the frame, and wherein the trailer has upwardly extending side panels mounted to the frame, and wherein each cover has a back panel, which is hinged along an upper edge to the frame, and a counter panel which extends outwardly approximately perpendicular to the back panel, wherein each counter panel is approximately one half the width of the frame, so that when the covers are rotated into a storage configuration, the two counter panels extend towards the center of the trailer, and wherein the covers are pivotable from the storage configuration to a dining configuration in which the back panels abut against the trailer side panels.

9. A food service trailer comprising:

a frame;

a plurality of wheels rotatably mounted beneath the frame;

a cook top fixed to the frame at a first level and facing upwardly;

a side panel fixed to the frame and extending downwardly from the first level;

a first cover rotatably mounted to the frame, the first cover being pivotable between a storage position and a deployed position, the first cover having a counter panel which extends generally horizontally in the deployed condition, and a back panel which extends upwardly from the counter panel, the back panel being pivotably mounted to the frame, such that when the first cover is rotated to the storage position the counter panel is positioned above the cook top.

10. The food service trailer of claim 9 further comprising:

a first cross member mounted to the frame;

a first extension member received within the first cross member and telescoping within the first cross member;

portions of the first extension member defining a leg fitting;

a first leg slidably received within the first extension member leg fitting;

a seat platform fixed to the first leg above the first extension member leg fitting; and portions of the first leg defining a leg base positioned below the leg fitting, wherein the first leg and the attached seat platform are movable between a lowered position in which the leg base is engagable with the ground, and an elevated position in which the leg base is elevated above the ground.

11. The food service trailer of claim 10 further comprising a fastener which restrains the first leg in a raised position, but does not engage the first leg in the lowered position.

12. The food service trailer of claim 10 further comprising:

a second leg spaced rearwardly of the first leg;

a second cross member spaced rearwardly of the first cross member; and a second extension member spaced rearwardly of the first extension member, and having a fitting at an outward end which receives the second leg.

13. The food service trailer of claim 10 wherein the seat platform is positioned on a first side of the frame, and further comprising a second seat platform positioned on a second side of the frame, the second seat platform being connected to at least one vertical leg which is received within a fitting on a second extension member which is retractable within a cross member fixed to the frame.

14. The food service trailer of claim 10 further comprising:

an upwardly opening C-channel mounted to the frame; and an angle bracket fixed to the seat platform, and having a downwardly extending leg which is engagable within the C-channel to retain the seat platform in an elevated position.

15. The food service trailer of claim 9 further comprising:

an oven mounted to the frame; and a refrigerator mounted to the frame.

16. The food service trailer of claim 9 further comprising:

a plurality of vertically extending corner poles spaced from the frame; and a canopy extending over the frame and being supported by the corner poles.

17. The food service trailer of claim 9 wherein the frame has a central tubular member extending frontwardly, and wherein the central tubular member receives therein a plurality of corner poles, which are removable for supporting a canopy above the frame.

18. The food service trailer of claim 9 further comprising a second cover, and wherein the first cover and the second cover are hinged to the frame, and wherein the trailer has upwardly extending side panels mounted to the frame, and wherein each cover is hinged along an upper edge of the back panel to the frame, and wherein each counter panel is approximately one half the width of the frame, so that when the covers are rotated into a storage configuration, the two counter panels extend towards the center of the trailer, and wherein the covers are pivotable from the storage configuration to a dining configuration in which the back panels abut against the trailer side panels.

19. A food service trailer comprising:

a frame;

a first side panel and a second side panel mounted to the frame, the first and second side panel being spaced from one another on opposite sides of the frame;

wheels mounted to the frame;

a pair of first cross tubes fixed beneath the frame and extending in the direction between the first side panel and the second side panel;

a pair of second cross tubes fixed beneath the frame approximately parallel to the first cross tubes;

a first bench mounted on two parallel first extension members to the first cross tubes;

a second bench mounted on two parallel second extension members to the second cross tubes, wherein the extension members of each bench are received in telescoping relation within the cross tubes to which they are mounted; and portions of each bench defining a seat platform which is connected to the two extension members for vertical displacement, and a plurality of legs extending downwardly from each seat platform, the bench and the attached legs being movable from an upper position secured adjacent a side panel, to a lower position below the first position and spaced outwardly from said side panel.

20. The food service trailer of claim 19 further comprising two covers hinged to the frame adjacent the first side panel and the second side panel, wherein each cover has a back panel, which is hinged along an upper edge to the frame, and a counter panel which extends outwardly approximately perpendicular to the back panel, wherein each counter panel is approximately one half the width of the frame, so that when the covers are rotated into a storage configuration, the two counter panels extend towards the center of the trailer, and wherein the covers are pivotable from the storage configuration to a dining configuration in which the back panels abut against the trailer side panels.

21. A food service trailer comprising:

a frame;

at least two wheels rotatably mounted to the frame;

first portions which extend downwardly from the frame to engage in telescoping relation a first extension member, the first extension member being extensible from a retracted position beneath the frame and received within the first portions, to an extended position which protrudes outwardly from the first portions;

portions of the first extension member defining a leg fitting;

a first leg slidably received within the first extension member leg fitting;

a seat platform fixed to the first leg above the first extension member leg fitting;

a lower end of the first leg positioned below the leg fitting; and a releasable fastener extensible between the leg fitting and the first leg to hold the first leg in a first elevated position, the first leg and the attached seat platform being movable between said first elevated position in which the leg is fixed to the leg fitting by the fastener, and a second position in which the leg is engageable with the ground.

22. The food service trailer of claim 21 wherein the first leg in the second position is not secured by the fastener and floats freely within the leg fitting.

* * * * *